United States Patent
Zawadowskiy et al.

(10) Patent No.: US 8,474,044 B2
(45) Date of Patent: Jun. 25, 2013

(54) ATTACK-RESISTANT VERIFICATION OF AUTO-GENERATED ANTI-MALWARE SIGNATURES

(75) Inventors: Andrew Zawadowskiy, Hollis, NH (US); Boris Ruchansky, Wayland, MA (US); Mikhail Cherepov, Lexington, MA (US)

(73) Assignee: Cisco Technology, Inc, San Jose, CA (US)

( * ) Notice: Subject to any disclaimer, the term of this patent is extended or adjusted under 35 U.S.C. 154(b) by 560 days.

(21) Appl. No.: 12/348,702

(22) Filed: Jan. 5, 2009

(65) Prior Publication Data

US 2010/0175132 A1 Jul. 8, 2010

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/23

(58) Field of Classification Search
USPC .......................................................... 726/23
See application file for complete search history.

(56) References Cited

U.S. PATENT DOCUMENTS

| | | | |
|---|---|---|---|
| 6,792,546 B1 * | 9/2004 | Shanklin et al. | 726/23 |
| 7,496,662 B1 * | 2/2009 | Roesch et al. | 709/224 |
| 7,540,025 B2 * | 5/2009 | Tzadikario | 726/22 |
| 2008/0016570 A1 * | 1/2008 | Capalik | 726/23 |
| 2008/0216175 A1 * | 9/2008 | Pike | 726/22 |
| 2008/0222729 A1 * | 9/2008 | Chen et al. | 726/24 |

* cited by examiner

*Primary Examiner* — Carl Colin
*Assistant Examiner* — John Elmore
(74) *Attorney, Agent, or Firm* — Patterson & Sheridan LLP

(57) ABSTRACT

Techniques are disclosed for verifying whether payload signatures correspond to a vulnerability or exploit. Generally a security system may be configured to detect an attack on a server while the server is processing a payload. The security system generates (or obtains) a provisional signature corresponding to the vulnerability. For example, a provisional signature may be generated for a vulnerability from a group of payloads determined to correspond to that vulnerability. The effects of subsequent payloads which match the provisional signature may be monitored. If the effects of a payload duplicate the attack symptoms, a confidence metric for provisional signature may be increased. Once the confidence metric exceeds a predetermined threshold, then the provisional signature may be made active and used to block traffic from reaching an intended destination.

18 Claims, 4 Drawing Sheets

ATTACK-RESISTANT VERIFICATION OF AUTO-GENERATED ANTI-MALWARE SIGNATURES

BACKGROUND

1. Field

Embodiments described in this disclosure relate to preventing malicious payloads from exploiting vulnerabilities on a server. More specifically, embodiments provide attack-resistant verification of auto-generated anti-malware signatures.

2. Description of the Related Art

As the internet has grown, malware has become a major concern for businesses and individuals connected to the internet and other networks. Malware (i.e., worms, spyware, etc.) is frequently delivered using a payload, which may target a particular vulnerability of an application. For example, server applications are widely available to respond to messages from any requesting party (e.g., a web server configured to respond to HTTP requests) and network messages may be crafted with payloads intentionally designed to exploit a vulnerability of a server. For example, a network message may include a payload that causes a buffer overflow on a vulnerable system, allowing a remote attacker to execute arbitrary shell code on a host system. In some cases, a payload designed to exploit a vulnerability may be identified using a signature (e.g., a hash value computed over all or a portion of the payload or by identifying specific arguments or combinations of arguments). If a particular payload signature is identified as being characteristic of a malicious payload, then messages carrying that payload may be blocked.

Because of the large number and variety of malware attacks that occur today, security systems, known as intrusion prevention systems (IPS) have been developed to automatically block malicious traffic using a database of malicious payload signatures. For example, a network administrator may deploy an IPS on a host system or at a gateway edge between a local network and the internet. When the IPS detects a malicious payload signature in a payload addressed to a server on that host, it may simply drop that message. That is, the IPS intercepts the message, preventing it from being forwarded towards a destination. Further, the IPS raises an alarm and even block future traffic from the source address. Of course, to be effective, an IPS needs to correctly distinguish between malicious and non-malicious payloads, and the signatures used by the IPS are a significant factor in the performance of an IPS. Typically, an IPS signature database may be updated periodically by security experts who study network traces after a worm has been released. Additionally, an IPS may employ an automatic signature generation security system to help maintain an effective signature database. For example, the IPS may monitor network traffic to identify a new attack vectors (i.e., new payloads) and produce a signature using pattern-based analysis. For example, for polymorphic malware, longest common token subsequence (LCTS) signatures are commonly used. Furthermore, malicious payload signatures may be grouped according to the vulnerability that is targeted by each payload.

SUMMARY

Embodiments described in this disclosure provide techniques allowing payload signatures generated by an automatic signature generation security system to be verified as actually corresponding to a vulnerability or exploit.

One embodiment described herein includes a computer system having at least a processor and a memory executing an application server. The computer system may also be executing an intrusion prevention application program, which, when executed on the processor performs an operation to generate and verity anti-malware signatures. The operation itself may generally include detecting a first attack on a server application, e.g., a buffer overflow occurs while processing a payload or a payload attempts to cause unauthorized shell code to be executed. Additionally, the intrusion prevention system may identify a state and an execution path of the server application following the detected attack.

The operation may further include determining a candidate payload being processed by the server application contemporaneous to the detected attack. A provisional signature corresponding to the attack may be obtained. For example, a provisional signature may be generated for a vulnerability from a group of payloads determined to correspond to that vulnerability. The provisional signature may be assigned a confidence metric. The confidence metric corresponds to a measure of confidence that the provisional signature actually corresponds to a vulnerability or exploit. Once the provisional signature is generated, if a payload intended for the server application itself matches the provisional signature, the effects of the server processing that payload may be monitored.

If the first payload results in a second attack on the server, then the confidence metric associated with the provisional signature may be increased. In some cases, the second attack may be detected by comparing aspects of the first detected attack (e.g., a stack state or execution flow following the attack) with the second detected attack. Further still, if the confidence metric associated with the provisional signature exceeds a predetermined threshold, then the provisional signature may be stored as a verified anti-malware signature. Thereafter, payloads intended for the server application which match the verified anti-malware signature may be blocked from being processed by the application server.

If a payload intended for the server application which matches the provisional signature does not result in an attack on the server application, then the provisional signature may be discarded. Alternatively, a new provisional signature corresponding to the vulnerability may be generated or formulated.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION OF THE PREFERRED EMBODIMENTS

Figure 1:
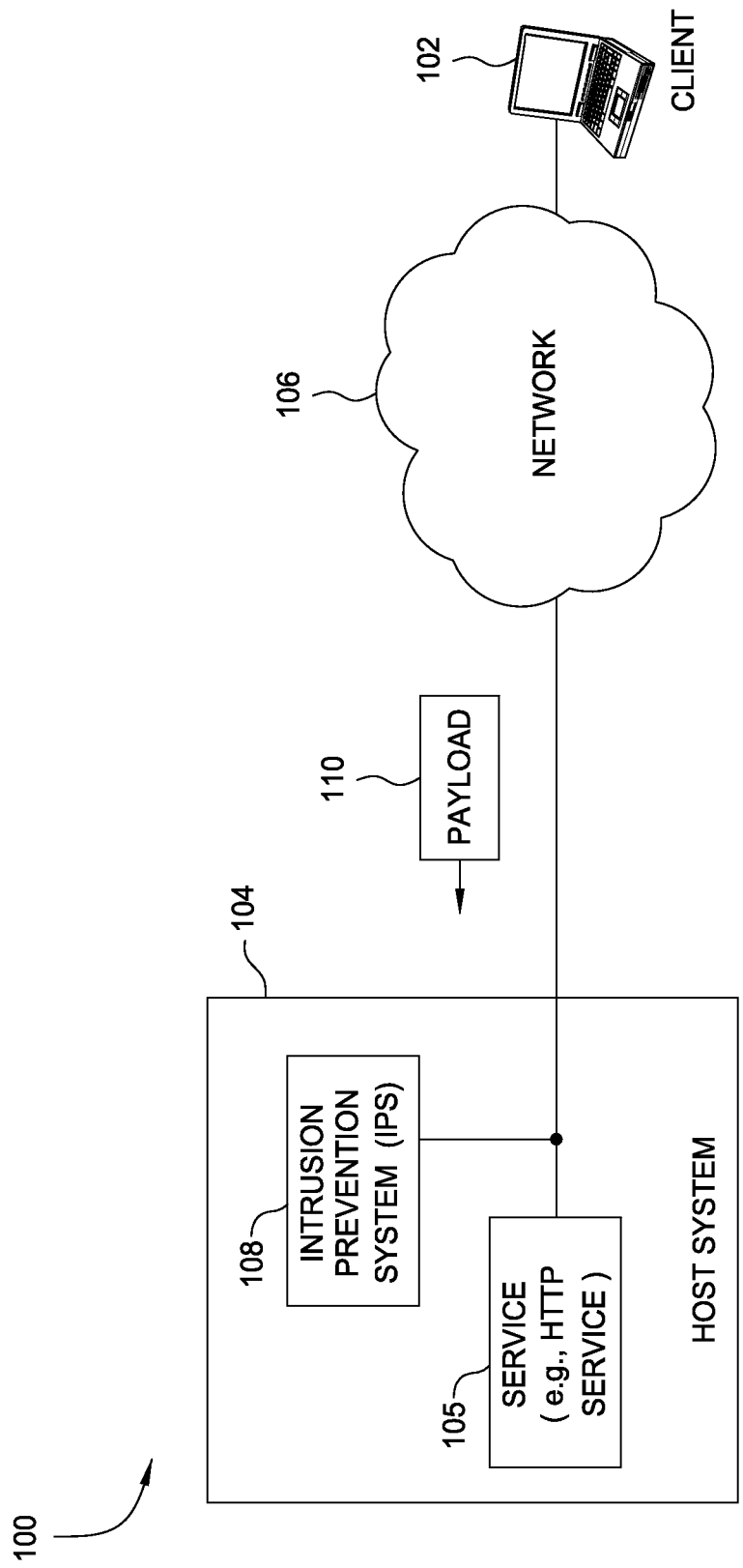
FIG. 1 is a diagram illustrating an intrusion prevention system operating on a host server, according to one embodiment.

Embodiments described in this disclosure provide techniques allowing payload signatures generated by a signature generation security system to be verified as actually corresponding to a vulnerability or exploit, e.g., a buffer overflow. The term buffer overflow generally refers to a type of security attack that attempts to cause a buffer overrun in a network server. This is frequently initiated by a directing a single, large universal resource locator (URL) to the network server to expose a deficiency in the handling of the URL. A buffer overrun can expose an opening to overwrite and/or replace a section of the memory with executable code intended to compromise the network server and any computing devices connected to the network server.

Two classes of attacks relevant to this disclosure are referred to as uncertain payload attacks (UPA) and uncertain grouping attacks (UGA). UPA occurs when an IPS detects an attack and generates a signature where any of several payloads could have caused the attack. UGA occurs when grouping is uncertain because of possible payload manipulation by the attacker. Consider the HTTP-borne attacks in the following URLs:

http://account/get_balance?name=Smith&Account=_
        VULN2_SHELLCODE_&DecoyArg1=1&
        DecoyArg2=2&DecoyArg3=3
    http://account/
        get_balance?name=Smith&Account=_VULN1_
        SHELLCODE_&DecoyArg1=1&DecoyArg2=2&
        DecoyArg3=3

Each attempts to exploit a different vulnerability and to disguise itself using three decoy arguments. Since these represent attacks on two different vulnerabilities (VULN1 and VULN2), they should ideally be placed into two different groups, with signatures used to indentify _VULN2_SHELLCODE_ and _VULN1_SHELLCODE_ in subsequent payloads. However, a signature-generation algorithm may create a signature combining the common substrings and discarding the differences. The resulting LCTS signature may consist of "account/get_balance?" and "&DecoyArg1=1&DecoyArg2=2&DecoyArg3=3." This signature is not useful (i.e., it fails to identify either malicious payload), and may match some protocol-header content, causing legitimate requests to be dropped as false positives.

By comparing elements of the computer system state during an attack to previous attacks (i.e., the stack, system calls, etc.), and by comparing payload signatures, an intrusion prevention system (IPS) may generate and verify anti-malware signatures in conditions of uncertainty about culprit payloads (uncertain payload attacks, or UPA) and uncertainty about payload grouping (uncertain payload attacks, or UGA). Thus, several types of ineffective (and potentially harmful) signatures derived from the automatic signature generation phase may be eliminated, including, e.g., signatures likely to cause false positives, signatures derived from attacker-manipulated payload content aiming to confuse the IPS, and signatures derived from attacker-manipulated payload content aiming to subvert the security system to carry out a denial of service (DOS) attack.

As discussed above, HTTP arguments may be manipulated by an attacker, e.g., the "DecoyArgs" above may be changed (in both order and content) in an effort to disguise the malicious content of the HTTP payload. Therefore, in addition to the arguments or content of a payload, the state of the stack or execution flow (or other elements of the host system state) may be used to help characterize an attack.

Generally, in one embodiment, an IPS may be configured to detect an attack on a host server while a server application executing on the host server is processing a payload. Once an attack is detected, the IPS generates (or obtains) a provisional signature. For example, a provisional signature may be generated for a vulnerability from a group of payloads determined to correspond to that vulnerability. The provisional signature, attack symptoms, and process state are stored in a signature database. When the IPS detects a payload that matches a provisional signature in the signature database, the IPS tracks the effects of the payload. If the effects of the payload do not duplicate the attack symptoms or process state that occurred when the payload was previously processed, the provisional signature is discarded (or a confidence metric associated with the payload may be decreased). However, if the effects of the payload duplicate the attack symptoms (and optionally a process state that occurred when the payload was previously processed), a confidence metric for the corresponding provisional payload signature may be increased.

Over time, after a number of attacks, if the confidence metric for a payload signature exceeds a predetermined threshold value, that signature is stored as a verified anti-malware active signature in the signature database. That is, once the confidence metric exceeds the threshold, the provisional signature is believed to accurately correspond to a malicious payload and may be used to actively block payloads from a destination on the host server (e.g., from a server application receiving legitimate network traffic). When the IPS detects a payload matching an active signature, the security system may block that payload. Further, discarded provisional signatures may be cached. Doing so may prevent the IPS from indefinitely repeating a generate/test/discard cycle for legitimate payloads. Further, if multiple payloads match a discarded provisional signature, the security system may infer the interface is under a denial of service (DOS) attack. In such a case, the IPS may simply block additional matching payloads entirely, allowing a server process to continue on unaffected interfaces.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

FIG. 1 is a diagram 100 illustrating an intrusion prevention system (IPS) 108 operating on a host system 104 and an external network 106, according to one embodiment. As shown, the IPS 108 provides a security system configured to monitor incoming traffic (i.e., payloads) addressed to a service 105 (e.g., a server application such as an HTTP webserver) running on the host system 104 received over an external network 106 (e.g., the internet, a WAN, etc.). Although only a single service 105 is shown, host system 104 may include multiple server applications (or multiple instances of the same server application) listening for traffic on different interfaces (e.g., on different network sockets). The IPS 108 may include the appropriate software components as needed to generate and verify anti-malware signatures as described in this disclosure.

In one embodiment, the IPS 108 examines payloads 110 received over the network 106, prior to such payloads 110 being delivered to service 105. For example, the IPS 108 may generate a signature corresponding to any given payload and compare that signature to a set of signatures matching known malicious payloads. If a match is found, the IPS 108 may block, redirect or otherwise alter processing of a payload 110.

The IPS 108 may also monitor payload 110 after being forwarded to service 105. Further, the IPS 108 may be configured to monitor service 105 and the host system 104 to identify when an attack has occurred (i.e., when a malicious payload exploits (or attempts to exploit) a vulnerability). For example, IPS 108 may be able to determine when a buffer overflow has occurred, when the service 105 crashes, when certain system calls are executed, or identify a variety of other aspects of the operational state of the host system 104 and the service 105 to identify when an attack has occurred. However identified, the IPS 108 may respond to a detected attack by identifying a payload forwarded towards the service 105 and generating a provisional signature to associate with the vulnerability believed to have been exploited by the payload. Thereafter, the IPS 108 may compare additional payloads with the provisional signature. If a match is found, the IPS 108 may monitor the results of forwarding a payload towards service 105. In turn, if such a payload results in a similar attack or an exploitation of a vulnerability present in service 105, then the IPS 108 may increase a confidence metric associated with the provisional signature. As the name implies, the confidence metric provides a measure of confidence whether a payload matching the provisional signature is, in fact, a malicious payload that should not be forwarded towards service 105.

Figure 2:
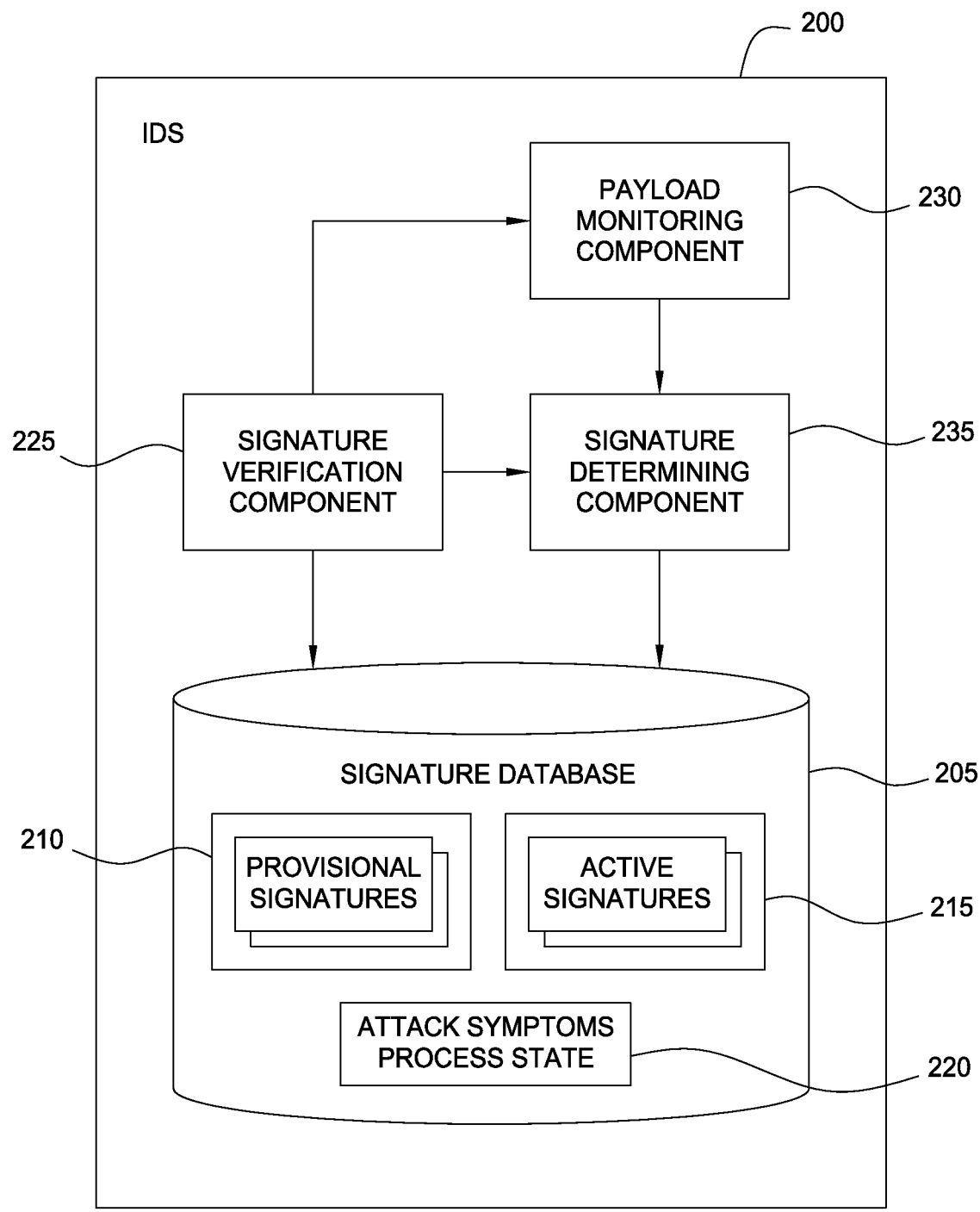
FIG. 2 is a block diagram illustrating an example of components of an intrusion prevention system, according to one embodiment.

FIG. 2 is a block diagram illustrating an example of components of an IPS 200, according to one embodiment. As shown, the IPS 200 includes a signature database 205 that stores provisional signatures 210, active signatures 215 and attack symptoms/process state 220. One of ordinary skill in the art will recognize that other methods may be used to store signatures, attack symptoms, and process states, including a different database, memory, cache, etc.

Illustratively, IPS 200 includes a signature verification component 225, a payload monitoring component 230, and a signature determining component 235. In one embodiment, the payload monitoring component 230 may monitor incoming payloads as they are received by the host system and delivered to a destination (e.g., service 105). Additionally, the payload monitoring component 230 may compare a a given message with both the provisional signatures 210 and active signatures 215. If an incoming payload matches an active signature 215, the IPS 108 may block the payload from being processed by service 105.

If an incoming payload matches a provisional signature 210, the payload monitoring component 230 may monitor what results happen to occur when the service 105 processes that payload. That is, a payload matching a provisional signature is delivered to the service addressed by the payload. For example, the IPS 200 may identify a destination of a given payload (e.g., an HTTP server) and monitor whether that payload causes the destination service to crash (or otherwise malfunction). If no attack is detected while the payload monitoring component 230 monitors a payload matching a provisional signature, then that provisional signature 210 may be discarded. In one embodiment, the payload monitoring component may store discarded provisional signatures in the signature database 205. If multiple payloads match a discarded provisional signature, the IPS 108 may block additional matching payloads to stop a DOS attack. If the payload does not match either provisional signatures 210 or active signatures 215, then the payload may be assumed to be legitimate and delivered to service 105. That is, a payload not matching any signature is just subject to regular processing.

However, if the payload monitoring component 230 detects the occurrence of an attack while monitoring a payload matching a provisional signature 210, and the current attack symptoms/process state of the server match the previous attack symptoms/process state associated with that provisional signature 210, then the signature verification component 235 may increase a confidence metric for that provisional signature 210. If the new value for the confidence metric is above a predetermined threshold value, the provisional signature 210 may be stored as one of the active signatures 215.

Figure 3:
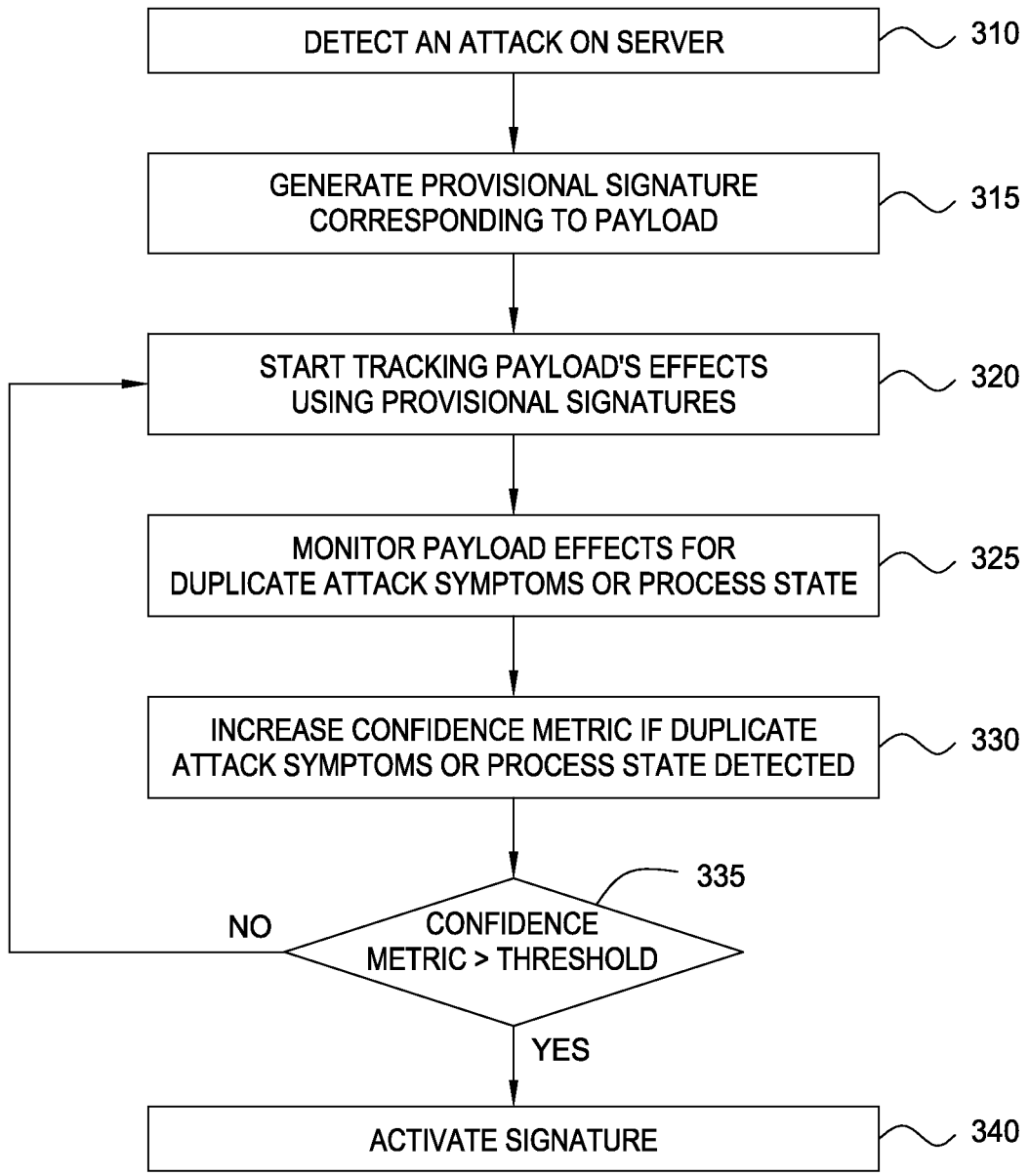
FIG. 3 illustrates a method for an intrusion prevention system to generate and verify anti-malware signatures, according to one embodiment.

FIG. 3 illustrates a method 300 for an intrusion prevention system (IPS) running on a host system alongside an application server to generate and verify anti-malware signatures, according to one embodiment. As shown, the method 300 begins at step 310, where the IPS determines that an attack has occurred on a server application. For example, a payload processed by the service may result in a buffer overflow, stack overflow, etc., allowing an attacker to execute arbitrary code or otherwise gain control of the server system. In response, the IPS may identify a payload being processed (or queued for processing) by the server application contemporaneous with the attack. That is, the IPS may identify a candidate payload.

At step 315, the IPS may generate (or otherwise obtain) a provisional signature corresponding to the candidate payload and the detected attack. Note, if multiple payloads were being processed (or queued for processing) when the attack detected at step 310 was detected, multiple provisional signatures may be generated.

At step 320, the IPS tracks the effects of additional payloads matching the provisional signature (or signatures) generated at step 315. For example, when a new payload is received, that payload is compared to the existing provisional signatures. Note, the payload may be evaluated using a relevant subset of available provisional signatures. For example, the payload may be addressed to a specific service running on the host server. In such a case, the payload may be compared with signatures corresponding to vulnerabilities of that service. Similarly, payloads may be compared with provisional signatures based on a corresponding application, operating system, interface, etc.

If the payload does not match a currently existing provisional signature (or active signature), the payload is allowed to reach the destination service. Of course, if the signature matches an active signature, the payload may be presumed to be malicious traffic and blocked.

Otherwise, if the IPS determines that the payload matches one of the provisional signatures, then at step 325, the IPS may monitor the effects of allowing that payload to reach a destination service. That is, the IPS may monitor payload effects for duplicate attack symptoms or process state, e.g., whether the payload causes the server to crash (or otherwise malfunction) or results in a particular process state or execution flow. If the effect of the payload duplicates the previous attack symptoms/process state associated with the provisional signature, then at step 330, the IPS increases the confidence metric associated with the matching provisional signature.

If allowing the payload to continue does not result in an attack on the server, then the provisional signature corresponding to that payload may be discarded from further consideration. Alternatively, in one embodiment, the discarded signature may be cached and used to prevent a generate/test/discard cycle for legitimate payloads cycle for payloads matching the provisional signature. Further still, if many messages are received with a payload matching a discarded signature, the IPS may infer that a DOS attack is in progress and block messages from progressing towards a destination.

At step 335, after increasing the confidence metric for a provisional signature, the IPS determines whether the confidence metric exceeds a predetermined threshold value. If so, the IPS stores the provisional signature as an active signature (step 340). In one embodiment, the IPS may notify the appropriate users (e.g., a system administrator) once a provisional signature is due for promotion to active status. For example, the IPS may be configured to send an alert (pager message, instant message, IM, email, etc.) to the appropriate system administrator that the confidence metric associated with a provisional signature indicates that the signature should be promoted to active status.

Following step 335 or 340, the method 300 returns to step 310, where the IPS evaluates any additional candidate payloads and monitors for a subsequent attack (or an attempt to exploit a vulnerability) of a server.

Figure 4A:
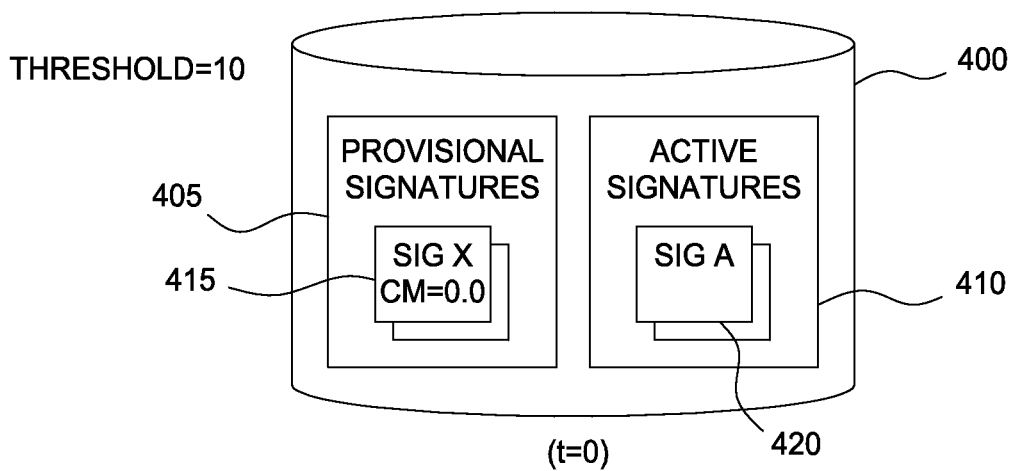
FIGS. 4A, 4B and 4C illustrate serial states of a signature database while an intrusion prevention system to verifies anti-malware signatures, according to one embodiment.
Figure 4B:
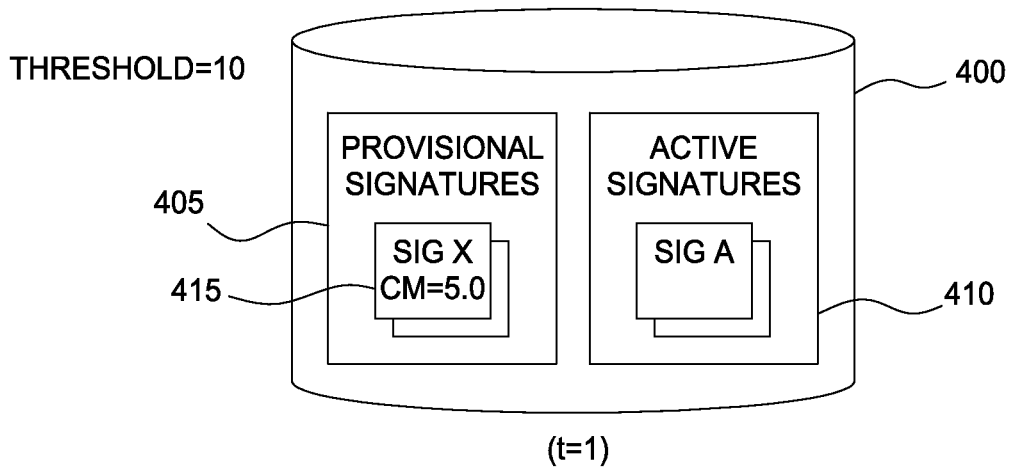
Figure 4C:
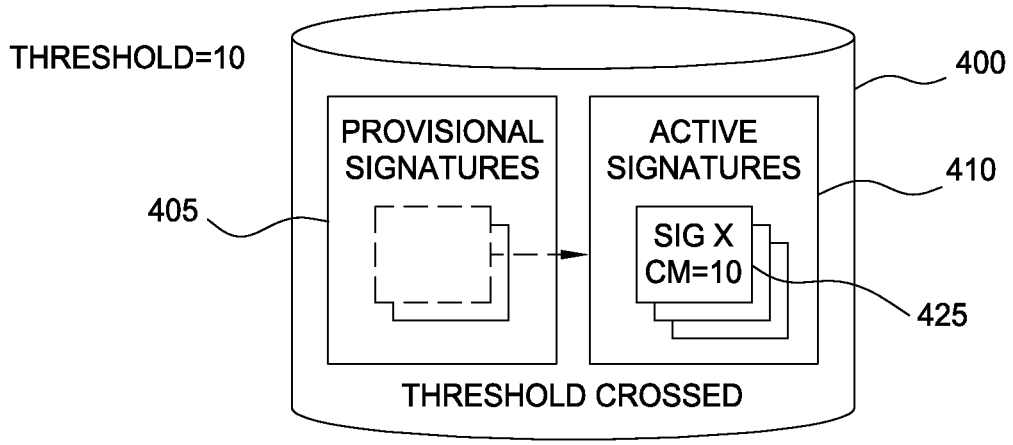

FIGS. 4A, 4B and 4C illustrate serial states of a signature database while an intrusion prevention system (IPS) verifies anti-malware signatures, according to one embodiment. FIG. 4A illustrates a signature database 400 storing a set of provisional signatures 405 and active signatures 410 at a time t=0. As shown, provisional signatures 405 includes a "Sig X" 415 representing a provisional signature having a confidence metric of 0.0. This may occur after the IPS identifies an attack on a server and generates (or obtains) a provisional signature for a payload that was being processed by the server at the time of the attack. In this example, as the "Sig X" 415 is new, the confidence metric for this provisional signature is set to 0.0. Additionally, a conformance metric threshold is set to 10.0. Of course, the value for an initial confidence metric and the threshold value may be tailored to suit the needs of an individual case. At the same time, active signatures 410 include a "Sig A" 420 representing a verified malware signature. That is, when the IPS identifies a payload with a signature matching "Sig A" 420, the IPS may presume that the payload is an attempt to attack a server application. In response, the IPS may block such a payload from being reaching the intended server application.

FIG. 4B illustrates the signature database 400 along with the set of provisional signatures 405 and the active signatures 410 at a time t=1. As shown, the confidence metric of provisional signature "Sig X" 415 has been increased to "5.0." This may occur once the IPS monitors payloads that match "Sig X" 415 being processed by a server application which also results in an attack on that application. As stated, in one embodiment, the IPS may verify that attack symptoms and/or process state match prior attacks on that server resulting from pervious payloads matching the same provisional signature. That is, the IPS may verify that both the payload and the resulting attack correspond to the provisional signature. When an application server processes a payload matching "Sig X" 415 is results in a duplication of the results of a previous attack (and/or attack symptoms/process state), the confidence measure for the provisional signature may be increased.

FIG. 4C illustrates the signature database 400 and the set of provisional signatures 405 and the active signatures 410 at a time t=2. As shown, the confidence metric of provisional signature "Sig X" 415 has been increased to "10.0." As described relative to FIG. 4B, the confidence metric may be increased when the IPS determines that the effect of a payload matching the provisional signature 415 duplicates the previous attack symptoms/process state associated with the provisional signature 415. As shown in FIG. 4C, the confidence metric associated with "Sig X" meets the required threshold of 10.0. Accordingly, "Sig X" has matured to an active signature 425. Subsequently, when the IPS identifies a payload matching "Sig X," the IPS may presume that the payload is intended to attack or exploit a vulnerability of a server application running on that system. In response, the IPS may block the payload from being processed by the server application.

Advantageously, embodiments described above provide techniques for verifying payload signatures generated by an automatic signature generation security system as corresponding to a vulnerability or exploit. Generally the security system may be configured to detect an attack on a server while the server is processing a payload. The security system generates (or obtains) a provisional signature corresponding to the vulnerability. For example, a provisional signature may be generated for a vulnerability from a group of payloads determined to correspond to that vulnerability.

The effects of subsequent payloads matching the provisional signature may be monitored. If the effects of a payload duplicate the attack symptoms or duplicate the process state that occurred when the payload was previously processed, a confidence metric for the provisional signature may be increased. Thus, through observation over time, the security system may verify whether a given provisional signature accurately predicts whether a given payload is intended to attack a server. Once the confidence metric exceeds a predetermined threshold, then that signature may be made active and used to block traffic from reaching an intended destination. Further, discarded provisional signatures may be stored. If multiple payloads match a discarded provisional signature, the security system may block additional matching payloads to stop a DOS attack.

While the foregoing is directed to embodiments of the present invention, other and further embodiments of the invention may be devised without departing from the basic scope thereof, and the scope thereof is determined by the claims that follow.

The invention claimed is:

1. A system, comprising:
a processor;
a memory; and
an intrusion prevention application, which, when executed by the processor is configured to verify anti-malware signatures by performing an operation, comprising:
  detecting a first attack on a server application executing on the system,
  determining a candidate payload being processed by the server application contemporaneous to the detected attack,
  generating a provisional signature corresponding to the first attack,
  upon determining a first payload addressed to the server application matches the provisional signature, monitoring the effects of the first payload when processed by the server application,
  upon determining that processing the first payload results in a second attack on the server application, increasing a confidence metric associated with the provisional signature,
  upon determining the confidence metric associated with the provisional signature matching the first payload exceeds a predetermined threshold, storing the provisional signature as a verified anti-malware signature,
  upon determining at least a second payload intended for the server application matches the provisional signature, monitoring the effects of the second payload when processed by the server application, and upon determining that processing the second payload does not result in an attack on the server application, discarding the provisional signature.

2. The system of claim 1, wherein the operation further comprises:
upon determining a second payload intended for the server application matches the verified anti-malware signature, blocking the second payload from being processed by the server application.

3. The system of claim 1, wherein the operation further comprises:
caching the discarded provisional signature; and
monitoring for a denial of service (DOS) attack resulting from receiving a plurality of payloads matching the discarded provisional signature.

4. The system of claim 1, wherein the first attack comprises a buffer overflow.

5. The system of claim 1, wherein the first attack comprises shell code configured to exploit a vulnerability of the server application which allows an attacker to cause the application server to execute the shell code on the processor.

6. The system of claim 5, wherein the shell code is delivered to the server application as an HTTP argument.

7. The system of claim 1, wherein the confidence metric provides a measure of confidence that the payload corresponding to the provisional signature carries an intended attack on the server application.

8. The system of claim 1, wherein determining that processing the first payload results in the second attack on the server application comprises:
comparing a stack state and an execution path of the server application following processing the first payload with a comparable stack state and execution path of the system following the first attack; and
identifying a match between the stack state and the execution path and the comparable stack state and the execution path.

9. A method to generate and verify anti-malware signatures, comprising:
detecting a first attack on a server application on a host system having at least a processor and a memory, wherein the host system executes an intrusion prevention application and the server application;
determining, by operation of the processor on the host system executing the intrusion prevention application, a candidate payload being processed by the server application contemporaneous to the detected attack;
generating a provisional signature corresponding to the first attack; upon determining a first payload intended for the server application matches the provisional signature, monitoring the effects of the first payload when processed by the server application;
upon determining that processing the first payload results in a second attack on the server application, increasing a confidence metric associated with the provisional signature;
upon determining the confidence metric associated with the provisional signature matching the first payload exceeds a predetermined threshold, storing the provisional signature as a verified anti-malware signature;
upon determining at least a second payload intended for the server application matches the provisional signature, monitoring the effects of the second payload when processed by the server application; and
upon determining that processing the second payload does not result in an attack on the server application, discarding the provisional signature.

10. The method of claim 9, further comprising:
upon determining a second payload intended for the server application matches the verified anti-malware signature, blocking the second payload from being processed by the server application.

11. The method of claim 9, further comprising:
caching the discarded provisional signature; and
monitoring for a denial of service (DOS) attack resulting from receiving a plurality of payloads matching the discarded provisional signature.

12. The method of claim 9, wherein the first attack comprises a buffer overflow.

13. The method of claim 9, wherein the first attack comprises shell code configured to exploit a vulnerability of the server application which allows an attacker to cause the application server execute the shell code on host system.

14. The method of claim 9, wherein determining that processing the first payload results in the second attack on the server application comprises:
comparing a stack state and an execution path of the server application following processing the first payload with a comparable stack state and execution path of the system following the first attack; and
identifying a match between the stack state and the execution path and the comparable stack state and the execution path.

15. A non-transitory computer-readable storage-medium containing a program which, when executed, performs an operation to generate and verify anti-malware signatures, the operation comprising:
detecting a first attack on a server application on a host system, wherein the host system executes an intrusion prevention application and the server application;
determining a candidate payload being processed by the server application contemporaneous to the detected attack;
generating a provisional signature corresponding to the first attack;
assigning a confidence metric to the provisional signature;
upon determining a first payload intended for the server application matches the provisional signature, monitoring the effects of the first payload when processed by the server application;
upon determining that processing the first payload results in a second attack on the server application, increasing a confidence metric associated with the provisional signature;
upon determining the confidence metric associated with the provisional signature matching the first payload exceeds a predetermined threshold, storing the provisional signature as a verified anti-malware signature;
upon determining at least a second payload intended for the server application matches the provisional signature, monitoring the effects of the second payload when processed by the server application; and
upon determining that processing the second payload does not result in an attack on the server application, discarding the provisional signature.

16. The non-transitory computer-readable storage-medium of claim 15, wherein the operation further comprises:
upon determining a second payload intended for the server application matches the verified anti-malware signature, blocking the second payload from being processed by the server application.

17. The non-transitory computer-readable storage-medium of claim 15, wherein the operation further comprises:
caching the discarded provisional signature; and monitoring for a denial of service (DOS) attack resulting from receiving a plurality of payloads matching the discarded provisional signature.

18. The non-transitory computer-readable storage-medium of claim 15, wherein determining that processing the first payload results in the second attack on the server application comprises:

comparing a stack state and an execution path of the server application following processing the first payload with a comparable stack state and execution path of the system following the first attack; and identifying a match between the stack state and the execution path and the comparable stack state and the execution path.

* * * * *